United States Patent

Lange et al.

[11] Patent Number: 6,085,847
[45] Date of Patent: Jul. 11, 2000

[54] SAND TRAP CONDITIONER

[75] Inventors: Richard M. Lange, Racine; Stephen R. Voss, Sturtevant; Kellen J. Chicoine, Racine, all of Wis.

[73] Assignee: Textron Inc., Providence, R.I.

[21] Appl. No.: 09/116,317

[22] Filed: Jul. 15, 1998

[51] Int. Cl.[7] .................................................. A01B 23/04
[52] U.S. Cl. .......................... 172/197; 172/198; 172/200
[58] Field of Search ..................................... 172/197, 199, 172/198, 200, 620

[56] References Cited

U.S. PATENT DOCUMENTS

| | | |
|---|---|---|
| 640,517 | 1/1900 | Ernst ........................................ 172/197 |
| 1,233,008 | 7/1917 | York ..................................... 172/197 X |
| 2,657,619 | 11/1953 | Gilreath .............................. 172/199 X |
| 2,719,393 | 10/1955 | Bowersox ........................... 172/197 X |
| 2,920,405 | 1/1960 | Cole .................................... 172/197 X |
| 3,613,802 | 10/1971 | Carlson et al. . |
| 3,771,608 | 11/1973 | Ancherko . |
| 3,823,781 | 7/1974 | Check et al. . |
| 5,265,681 | 11/1993 | Kincses . |
| 5,289,879 | 3/1994 | Fay et al. . |

*Primary Examiner*—Christopher J. Novosad
*Attorney, Agent, or Firm*—Arthur J. Hansmann

[57] ABSTRACT

A sand trap rake arranged particularly for use on a golf course and with fingers which penetrate the sand for plowing the sand. There is an adjustment relative to the plowing fingers which permits the fingers to be angulated so that they can be dragged through the sand with the tips of the fingers being in trailing position. The entire machine includes the plowing fingers arranged on one planar piece and being disposed in a plurality thereof in end-to-end relationship to each other and with dresser plates trailing the plowing fingers for smoothing the top of the sand.

9 Claims, 3 Drawing Sheets

SAND TRAP CONDITIONER

This invention relates to a sand trap conditioner, and, more particularly, it relates to a sand rake particularly suitable for use on golf course sand traps.

BACKGROUND OF THE INVENTION

The prior art is already aware of sand trap rakes which are powered by a tractor or the like and which have fingers for plowing through the sand and to be followed by dresser or like implements for smoothing the sand. These rakes are commonly used when the surface of the sand has been upset, or when the sand has become hardened by weather conditions including rain, snow, freezing, and the like.

The present invention provides a sand trap rake which plows or conditions the sand to loosen and smooth the sand, all in one pass of the implement. In doing so, the tines which plow through the sand are disposed at a reclining angle so that any debris or the like which would otherwise tend to be caught by the tines will be removed from the tines when the tines are dragged at the inclined angle. In this arrangement, the tines are placed at the angle to the ground surface where any debris will be brushed off the tines. Further, the tines are presented on a single plate which has a backing and a plurality of tine fingers, all of which can be suitably attached to a support which is adjustable for purposes of altering the angle of inclination.

Still further, it is important in most environments, particularly with a golf course environment, to avoid creation of distraction noises, and the present invention does so by means of avoiding disturbing noises created by the articular parts of this machine being in contact with each other. In accomplishing this objective, there is an avoidance of chains which otherwise would be connecting parts, and there is utilization of dampening bumpers intervening between moving parts.

Still further, the present invention provides for the dragging of sand conditioning members which are restrictively free to move up and down but, by means of this invention, the upward movement is restricted so that the members remain in an operative position and do not flip upwardly out of that position.

Thus, the conditioner members of this invention are in modular sections in end-to-end relationship across the swath of the machine, and the tines themselves are adjustable for selecting the angle at which they produce the plowing action through the sand, as mentioned above. The adjustment is such that a plurality of angles can be selected, and, in each position, the angulated tines are held in a fixed position until moved to the next adjustment, as desired. With that feature, the tines can be positioned for optimal treatment of the sand, according to the condition of the sand, such as compacted, loose, wet, frozen, with debris, or the like. Further, with the angulated adjustment arrangement, the depth of penetration into the sand can be selected and controlled.

The adjustable rake sections of this invention have three adjustable positions, although there could be any number of positions such as achieved by means of a slotted adjustment which would present infinite variety of positions. This allows the golf course maintenance personnel to operate with only the one attachment which is adjustable to the different angles based on the amount of aggressiveness required. Different times of the year may require more or less grooming, such as the early spring, after winter snow, and rain may require the sand to be loosened more, and then during normal summer operations, a less aggressive grooming is required. The system allows for an easy and quick adjustable method to change the aggressiveness of the rake. The adjustable rake sections are tipped at an angle for the operation in all settings. This allows for most of the debris that typically builds up on other's vertical fingers to easily slide away from the fingers and not plug the rake. Typically during the fall when leaves are present, and also when the traps have grass starting to grow into them, debris becomes a problem, and the rake of this invention negotiates those conditions.

The adjustable rake sections of this invention have the tines thereon which are a substitute for the commonly used vertically positioned bolted studs in other rakes. Those studs typically wear after use, and it is time consuming to unbolt and replace them after their useful life. With the rake of this invention, the complete section of tines is replaced as one section or unit, and only a few fasteners are required and thus there is a savings of time in the replacement.

DETAILED DESCRIPTION OF THE PREFERRED EMBODIMENT

Figure 1:
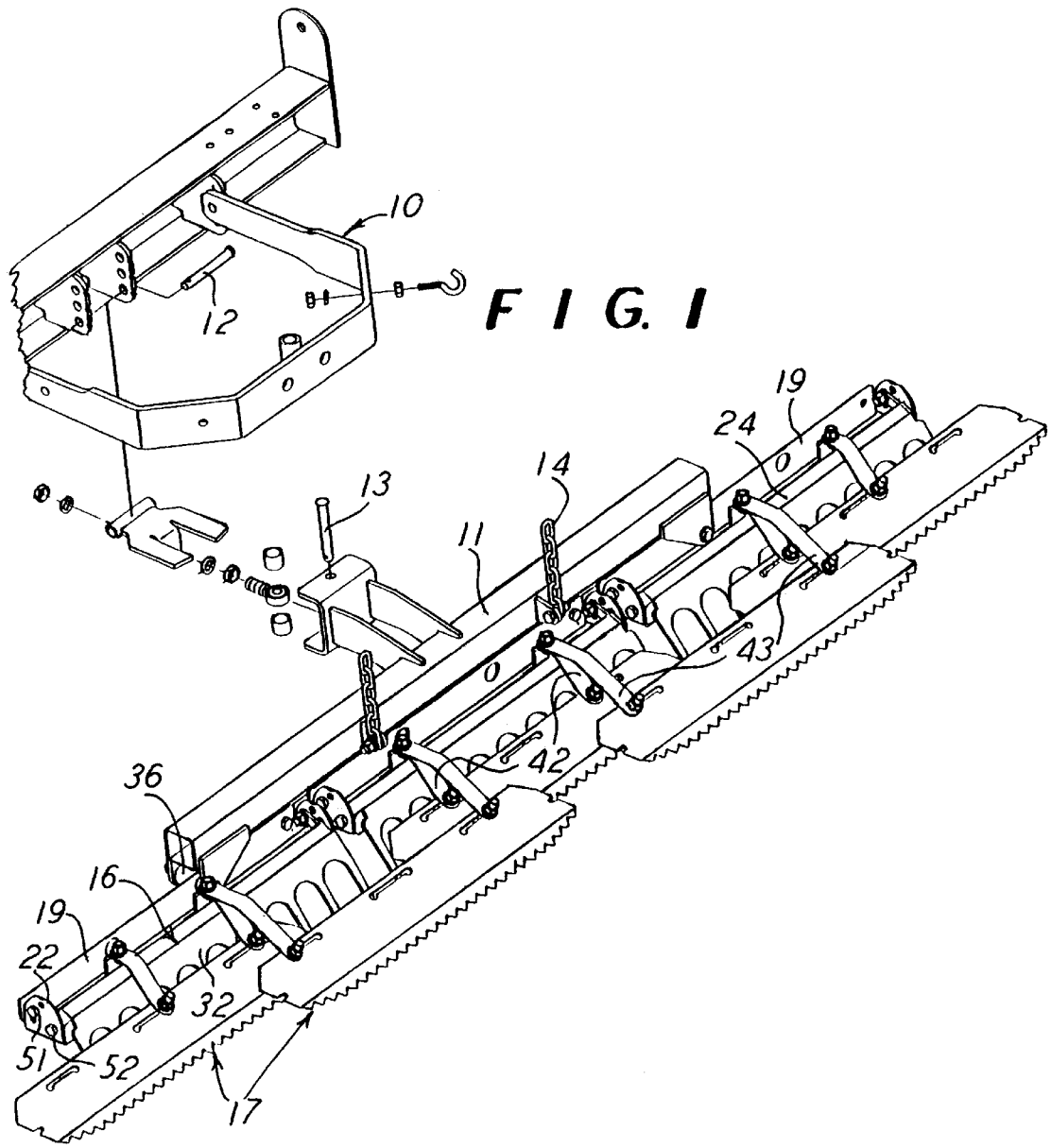
FIG. 1 is a top rear perspective view of a preferred embodiment of this invention, in exploded relationship with a supporting tractor.

A rear portion 10 of a conventional type of tractor is shown in exploded view to give transport and support for a horizontally disposed beam or connection bar 11. Pivot pins 12 and 13 respectively present a vertical and horizontal pivot of the beam 11 relative to the tractor 10. Also, chains 14 connect between the tractor 10 and the beam 11 for upward support of the beam, such as in the transport position for the rake being shown and described.

Figure 2:
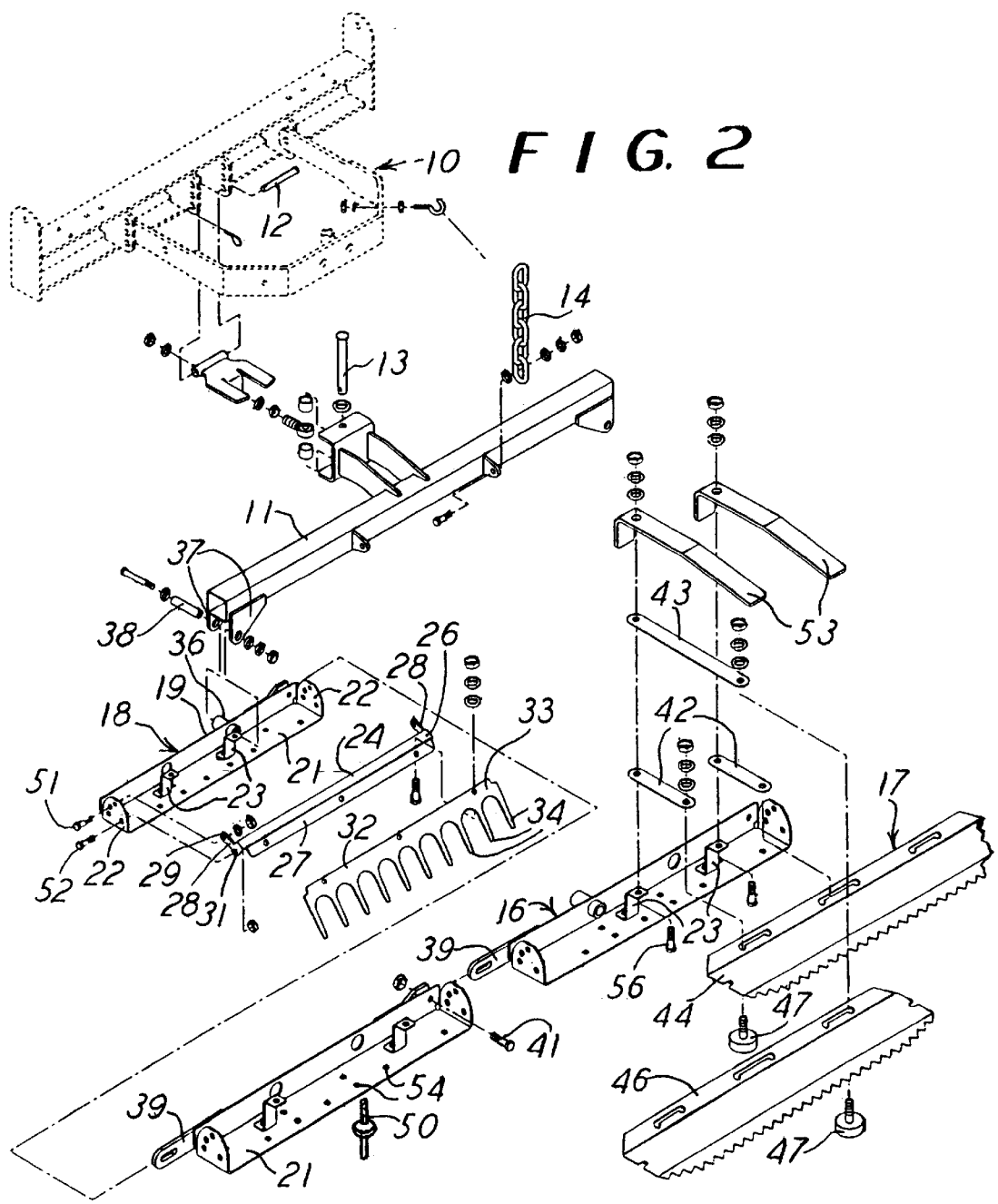
FIG. 2 is a perspective and exploded view of a portion of FIG. 1.

The assembly will of course move to the left, as viewed in FIGS. 1 and 2, and thus there are sand-penetrating assemblies designated 16 and sand-dresser assemblies designated 17, all trailing the beam 11 and being supported therefrom. The assemblies 16 and 17 are modular and exist in three shown end-to-end assemblies 16 and five shown staggered dressers 17. Of course they are all arranged to provide one wide swath through and over the sand of a sand trap golf course, for instance.

The assemblies 16 include a base or box support member 18 which is elongated and arranged in a right angulated arrangement of an upstanding portion 19 and a horizontal portion 21 integral with each other. Also, upstanding end pieces 22 are at each end of the member 18. Further, there are two upstanding posts or brackets 23 affixed to the member 18.

The assemblies 16 also include an angulated bar member 24 which has an upward and horizontally disposed portion 26 and a rearward and inclined plate portion 27. Also, the member 24 has end tangs or extensions 28 each with suitable bolt holes 29 and 31 extending therethrough.

The member 24 is positioned to nest within the member 18, and the tangs 28 extend adjacent the upstanding end pieces 22 of the member 18.

Figure 3:
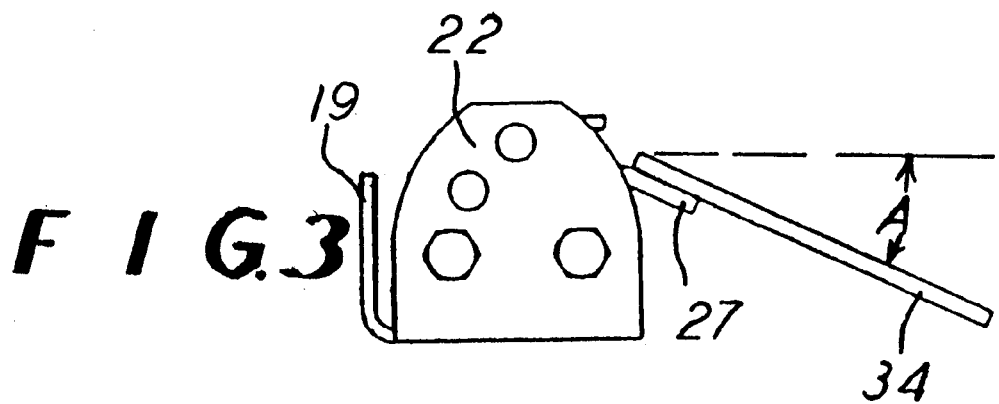
FIGS. 3, 4, and 5 are enlarged side elevational views of a portion of FIG. 2 and showing the parts in adjusted positions among the three views.
Figure 4:
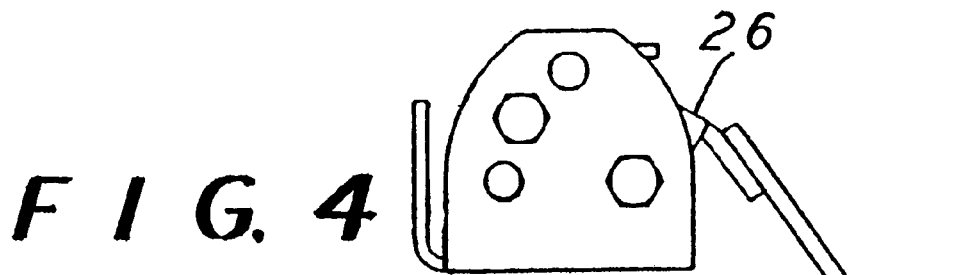
Figure 5:
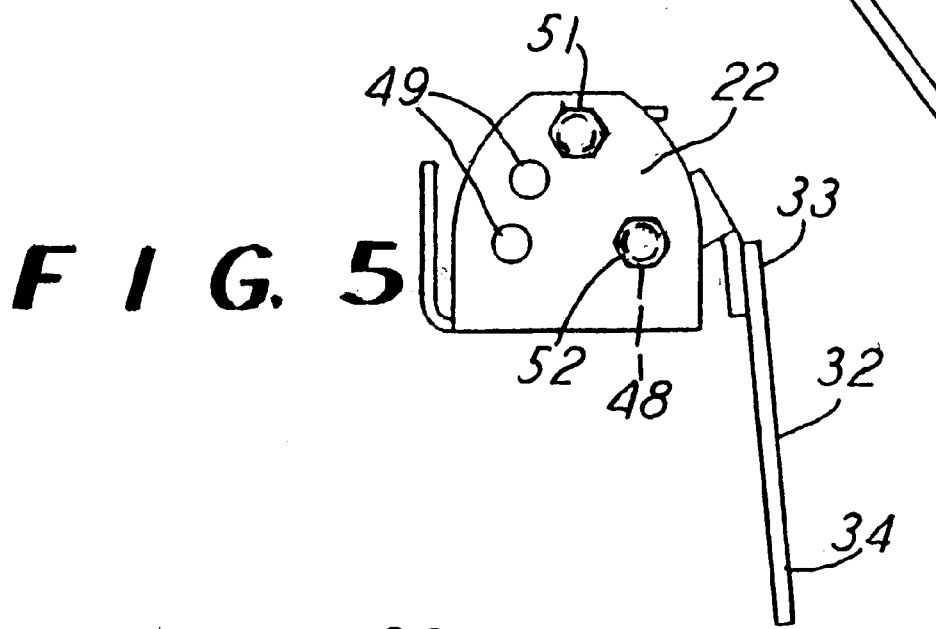

A third part for the assembly 16 is the tine plate 32 which includes the base or back portion 33 and the plurality of fingers 34. As seen in FIGS. 3, 4, and 5, the plate 32 is of a planar configuration in that it extends along one plane, and the plurality of fingers 34 extend therealong and of course are spaced apart, all as clearly shown in FIG. 2.

FIG. 2 also shows, by the exploded lines, the bolted connections for the tine plate 32 to be bolted to the bar 24, and, in turn, the bar 24, through its tangs 28, to be adjustably bolted to the member 18. As such, the three members 18, 24, and 32 are all suitably bolted together in one unit with the member 32 being in a fixed position relative to the member 24 and extending along the planar portion 27. The connecting lines and bolts and nuts are as shown in the drawings to accomplish the assembly described.

The assemblies 16 are articularly attached to the beam 11, such as by the sleeve 36 on the member 18 which is received within the plates 37 on the beam 11. Again, suitable bolts and nuts are utilized for making that articular attachment so that the assemblies 16 can rock laterally relative to the mounting sleeve 38 which connects between the plates 37 and the aforementioned sleeve 36.

FIG. 2 further shows that the center assembly 16 is supported by the two flanking and end assemblies 16, such as by connecting thereto by means of the slotted plates 39 extending off each single assembly 16 for making a bolted connection with the next assembly 16, such as through the shown bolt 41.

In that arrangement, the three assemblies 16 are in end-to-end relationship and are articularly mounted relative to the beam 11 to pivot laterally or parallel to the longitudinal plane of the beam 11 and thereby accommodate variations in the grade or level of the sand being worked upon.

Also, as mentioned, each assembly 16 includes the upstanding brackets 23 which have holes in the upper ends thereof for receiving two short straps 42 and two of a long strap 43. The straps 42 and 43 are thus suitably connected to the assemblies 16 and extend rearwardly therefrom and in turn suitably connect to the respective dresser members 44 and 46. In that arrangement, there is no metal member connecting the dressers 44 and 46 into the overall machine, and thus there is no creation of undue noise because the straps 42 and 43 are of a plastic, leather, or like durable material which does not create a sound when engaged by or with another member, but flexes.

Still further, there is a rubber or plastic type bumper 47 connected to one of the members 44 or 46 to extend therebetween and thus avoid noise production if the two members 44 and 46 were to come together. Also, the bumpers 47 are shown to contain the bolt threads for connecting the dressers 44 and 46 with the respective straps 42 and 43 and to the nuts shown adjacent thereto.

FIGS. 3, 4, 5, and 6 show the adjustable connection for the rake 32, and it is seen that the member 24 has its tangs or arms 28 integral therewith, along with the planar piece 27 which extends for virtually the length of the member 24 as seen in FIG. 2. The rake 32 then has its planar portion 33 in contact with the wall 27, and the rake is suitably secured thereto by bolts, such as those shown in FIG. 2.

Figure 6:
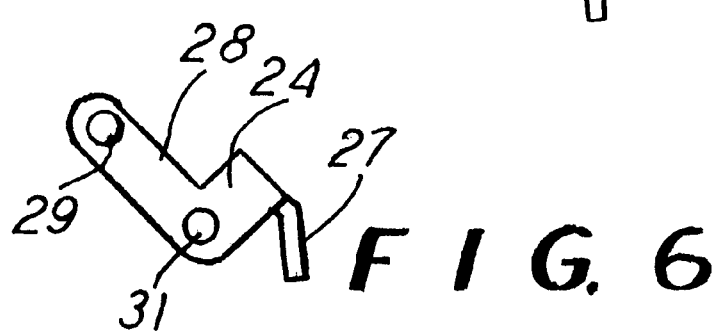
FIG. 6 is a side elevational view of the adjustable parts shown in FIGS. 2, 3, 4, and 5.

The member 24 has its two spaced-apart holes 29 and 31 in its upright or tang portion 28, as seen in FIGS. 2 and 6. The hole 31 aligns with a like hole 48 in each of the two upstanding side pieces 22, and the hole 29 selectively aligns with one of the three holes 49 on the side piece 22. With that arrangement, the member 24, along with its affixed rake 32, can be angulated among the three positions shown in FIGS. 3, 4 and 5. Therefore, the angulation of the rake 32 with its lower end rightward as seen in FIGS. 3, 4, and 5, creates the negative or drag angle of the rake 32 relative to the forward movement of the machine over the ground, that is, leftward in FIGS. 3, 4, and 5. Also, in FIG. 3, the rake fingers 34 are at their shallowest sand penetration, and in FIG. 5, the fingers 34 are at their maximum penetration. However, the fingers 34 are never positioned directly vertically, and they are therefore also in the defined negative angle for dragging the fingers 34 through the sand in the plowing action. Of course there are two bolts 51 and 52 which respectively extend through the aligned holes 29 and 49 and also aligned holes 31 and 48, for securing the member 24 with the rake 32 to the box member 18.

The arrangement is such that, if desired, the vertically disposed studs 50 can be secured to the planar portion 21 of the box member 18, if and when desired. It would be understood that there would be a plurality of the studs 50 extending through the openings 54 in the planar portion 21, and that arrangement could be supplement the plowing of the sand in addition to the use of the rake 32, or even alternative thereto. That is, the arrangement with the member 24 accommodates the inclusion of the fingers 34 and the studs 50 in the entire machine.

FIG. 2, but not FIG. 1, shows two angulated bars 53 which are mounted on the respective upright 23, such as by means of the standard bolts and nuts shown. The bars 53 extend rearwardly and over the dresser plates 44 to engage the plates 44 in the event they tend to rise up and possibly flip over beyond the desired operating position of being dragged over the top of the sand. It will be understood that there can be one or two of the bars 53 for every one of the plates 44. Also, as shown, a single screw, such as the screw 56 can be utilized for holding one end of the two straps 42 and 43 as well as one end of the bar 53 on the assembly 16.

FIGS. 3, 4, and 5, show the angulation of the time plate 32, and FIG. 3 shows the shallow angle A relative to the horizontal ground line, and FIGS. 4 and 5 show a greater angulation relative to the ground. Angle A_ is the angle of inclination of the plate 32 relative to the horizontal ground line.

What is claimed is:

1. A sand trap rake assembly comprising a plurality of elongated members extending in end-to-end relationship and being articularly connected together, a mounting beam articularly connected to said members for upwardly supporting said members above the ground and for transporting said members in a selected operating direction over the ground, a tine plate adjustably connected to each of said members and having spaced-apart fingers depending on each said plate and disposed at a declining angle which is both downward and rearward relative to the operating direction to thereby have said fingers dragged through the sand of the said trap at the declining angle, said members having oppositely disposed ends with vertically disposed portions on each oppositely disposed end of said members, threaded adjustable connections interconnecting said members and said plates for selectively and releasably fixedly establishing the declining angle and thereby angularly adjustably positioning said plates relative to said members, said portions and said tine plates having holes disposed therebetween and respectively alignable with each other, and said threaded connections include said alignable holes and fasteners extending in said holes and between said portions and said tine plates, and said connections are arranged to secure said tine plates in the selective angularly adjusted positions relative to said members.

2. The sand trap assembly as claimed in claim 1, including serrated sand combing plates movably attached to said members in positions to trail said tine plates during movement in the operating directions and thereby being arranged to have said serrated plates dragged over the sand.

3. The sand trap assembly as claimed in claim 2, including anti-flip bars interengaged between said beam and said combing plates and being arranged to obstruct any tendency of said combing plates flipping over to an upside-down position.

4. The sand trap assembly as claimed in claim 2, including bumpers attached to said members and extending interposed between said members and said serrated plates for precluding contact between said serrated plates and said members.

5. The sand trap rake assembly as claimed in claim 1, wherein one of said holes on either one of said portions or said members is disposed in an arcuate pattern for adjustable pivotal movement of said tine plates relative to said members, and said fasteners are threaded bolts.

6. The sand trap rake assembly as claimed in claim 1, wherein said members are each of a non-planar multi-sided configuration angled in cross-sectional shape along a plane extending in the operating direction and said portions are corner portions fixedly disposed at each of said opposite ends of said members, said tine plates having two opposite ends and support portions at each of said opposite ends of said tine plates, and said corner portions and said support portions having matching surfaces disposed in contact with each other for adjustable sliding movement of said therebetween and with said adjustable connections extending between respective ones of said corner portions and said support portions for the releasably angularly adjustably positioning said tine plates on said members.

7. The sand trap rake assembly as claimed in claim 6, wherein said tine plates include a base portion extending in one flat plane for the entire length of said tine plates between its said opposite ends, and said fingers being integral with and extending from said base portion and being spaced apart and disposed only in said plane of said base portion.

8. A sand trap rake assembly comprising a plurality of elongated interconnection members extending in end-to-end relationship and being articularly connected together, a mounting beam articularly connected to said interconnection members for upwardly supporting said interconnection members above the ground and for movement of said interconnection members in a selected operating direction over the ground, a tine member pivotally adjustably connected to each of said interconnection members on an axis transverse to the operating direction and said tine members having spaced-apart fingers thereon and disposed at a declining angle to thereby extend downward and rearward relative to the operating direction to be dragged through the sand of the said trap, said interconnection members and said tine members both having respective portions thereof extending in planes parallel to the operating direction and with said portions being in respective overlapping relationship and having holes extending therethrough and aligned therebetween, and adjustable connectors extending through said aligned holes between said interconnection members and said tine members for selecting and establishing the declining angle and thereby angularly adjustably positioning said fingers relative to said interconnection members.

9. The sand trap rake assembly as claimed in claim 8, wherein said tine members each include two separate pieces consisting of a base piece and a tine plate piece, and with said two pieces being releasably connected together and with said base piece having oppositely disposed ends and a surface extending in one flat plane between said ends, and said tine piece being disposed and supported on said surface, and said fingers being integral with and extending on said tine plate piece and being spaced apart and disposed only in said flat plane of said base piece.

* * * * *